Aug. 20, 1929.  F. W. MERRILL  1,725,662

SYNCHRONOUS INDUCTOR FREQUENCY CHANGER

Filed Dec. 24, 1927

Inventor:
Frank W Merrill:
by *Alexander S. Lunt*
His Attorney.

Patented Aug. 20, 1929.

1,725,662

UNITED STATES PATENT OFFICE.

FRANK W. MERRILL, OF FORT WAYNE, INDIANA, ASSIGNOR TO GENERAL ELECTRIC COMPANY, A CORPORATION OF NEW YORK.

SYNCHRONOUS INDUCTOR FREQUENCY CHANGER.

Application filed December 24, 1927. Serial No. 242,305.

My invention relates to inductor frequency changers of the single unit, self-driven type, arranged for synchronous operation and consequently for a fixed ratio of frequency transformation. The frequency changer of my invention is primarily intended for obtaining a relatively small amount of alternating current energy at a frequency somewhat higher than is ordinarily available, for example for obtaining 300 cycle energy from an available 25 cycle supply.

The frequency changer of my invention is preferably made to be self-starting and operates synchronously as a reaction motor. In carrying my invention into effect I provide a dynamo-electric machine having stator and rotor members, one of which is provided with a primary energizing winding and the other of which is provided with a generating winding and preferably also with some form of starting winding, for example a squirrel cage. The primary and generating windings are wound for different numbers of poles and provided with cooperating teeth arranged for inductor alternator generator action, and also for causing synchronous rotation as a synchronous reaction motor. The machine might be termed an alternating current excited synchronous motor-inductor alternator. A special relation of the number of inductor alternator teeth and squirrel cage bars is provided to prevent interference of the induction generator action by the squirrel cage.

The features of my invention which are believed to be novel and patentable will be pointed out in the claims appended hereto. For a better understanding of my invention reference is made in the following description to the accompanying drawings in which Fig. 1 represents an explanatory diagram of the machine of my invention in which the rotor constitutes the primary member and is wound 2-pole for a three-wire, two-phase supply; and Fig. 2 represents a modification where the stator is the primary member.

Figure 1:
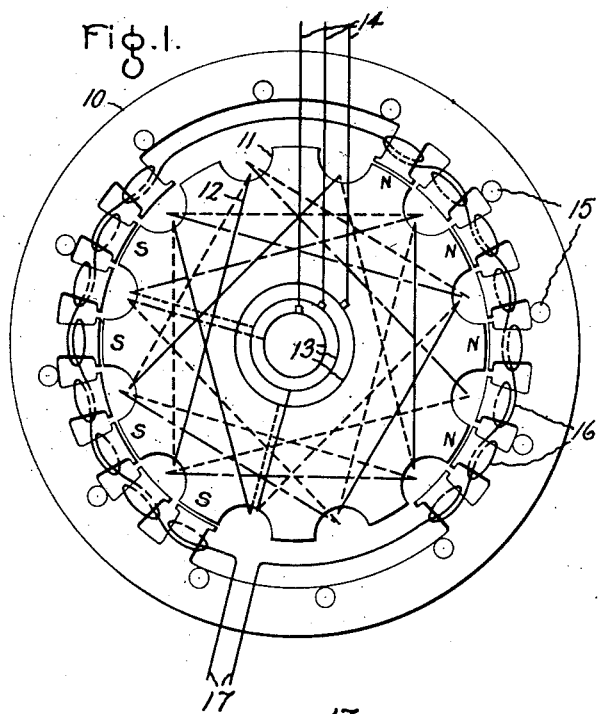
Figure 2:
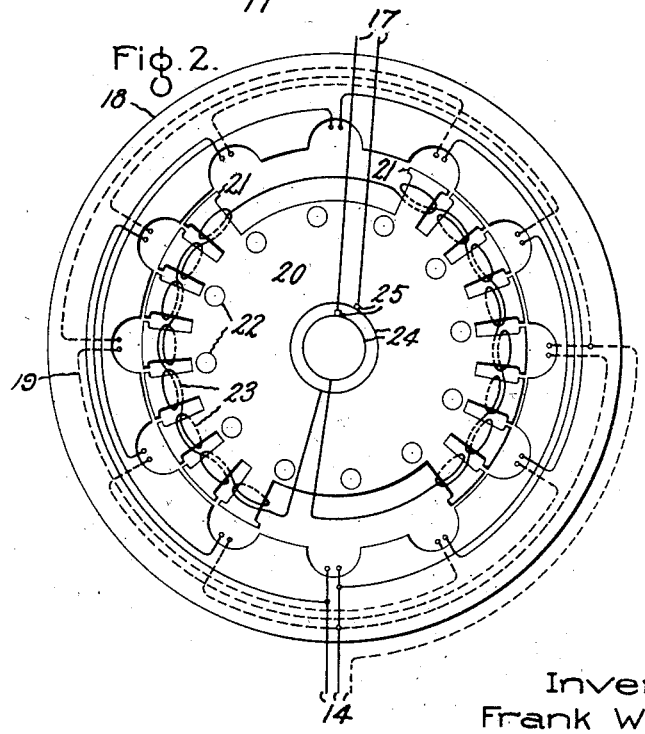

Referring to Fig. 1, 10 represents the stator and 11 the rotor of a frequency changer of my invention in which the rotor is made the primary member. The primary member is wound with a two-pole, two-phase winding 12 arranged to be supplied three-wire through slip rings 13 from a source 14. One phase is represented by full line end connections and the other phase by a dot-dash-dot line end connections on the near end of the rotor, while the rear end connections for both phases are represented by dotted lines. Twelve rotor teeth are represented for this two-pole primary rotor and for this arrangement the stator teeth are spaced as for 24 teeth of approximately the same dimensions but a portion of them are omitted on opposite sides of the stator providing two polar salients to give the machine a magnetic circuit corresponding to a two-pole reaction motor. 15 represents the bars of a squirrel cage winding provided primarily for starting purposes and it will be noticed that these bars are spaced apart a distance corresponding to the spacing of two stator teeth and are located between pairs of teeth. The stator teeth accommodate a corresponding number of series connected coils 16 wound in opposite directions on adjacent teeth and so that all of the coils on one main pole which are adjacent rotor teeth at any instant are connected in the reverse direction to all of the coils on the other main pole which are adjacent rotor teeth at the same instant. This corresponds to the generating winding of an inductor alternator.

The operation of the machine is as follows: The rotor is excited from a suitable source of alternating current which we will assume to have a frequency of 25 cycles. The machine starts as an induction motor by reason of the secondary squirrel cage winding 15. Because of the polar construction of the magnetic circuit of the stator the machine pulls into synchronism and runs synchronously as a 2-pole reaction motor at 1500 R. P. M. The two-pole field which is rotating synchronously with respect to the rotor thus becomes stationary in space so that the teeth at the right of the stator may be considered as a north pole and the stator teeth to the left of the stator as a south pole. This unidirectional flux will of course take the path of least reluctance at any instant and consequently shifts back and forth between adjacent stator teeth as the rotor teeth move from one to the other and produce an inductor alternator distribution of the flux in the teeth of the polar salients. Consequently, voltages are generated in the stator coils as in an inductor alternator and these voltages add at any instant but are reverse in direction as the rotor teeth pass from one stator tooth to the next. We may therefore take off high frequency alternating current from the series connected stator coils from the leads 17. It is of course possible to connect the coils of one polar salient in parallel with those of the other polar salient to obtain a higher secondary current at reduced voltage. In the example given the generated frequency will be 300 cycles.

In order that the shifting of the stator flux from one tooth to the other shall produce a minimum effect upon the squirrel cage at synchronous speed the particular arrangement of the bars 15 and stator teeth previously described is provided. The stator teeth are paired off by the squirrel cage bars so that the flux in passing from one tooth to the other of its pair will not cut a squirrel cage bar. Thus the flux lines passing through the north pole teeth as represented in Fig. 1 will shift downward one tooth as the rotor makes 1/12th of a revolution, but in doing so it will not cut a squirrel cage bar because there is no bar between such pairs of teeth. Thus little if any energy is lost in the squirrel cage winding at synchronous speed under normal conditions. At synchronous speed the squirrel cage serves as a means for preventing the rotor from falling out of step due to surges such as might be caused by sudden changes in load or line voltage.

Thus we obtain a combination self-starting synchronous reaction motor and inductor alternator. The same flux which produces the synchronous reaction motor torque is utilized in the coils 16. The primary winding is placed on the member which corresponds to the inductor rotor of an ordinary inductor alternator and the secondary or high frequency winding goes on the member which corresponds to the inductor stator of the ordinary inductor alternator. The field produced by the primary member is stationary with respect to the secondary member and is comparable to the direct current field excitation usually employed in stator members of inductor alternators. The high frequency alternating current voltage is generated by pure inductor action of the primary teeth on the stationary secondary flux.

In Fig. 2 the rotor and stator are reversed so that the stator becomes the primary member and the rotor the secondary member but the same principles above described apply.

In Fig. 2, 18 represents the stator provided with a two-pole, two-phase, three-wire primary energizing winding 19. The connections for one phase are indicated by dotted lines. 20 represents the rotor having two groups of teeth 21, making the bipolar synchronous reaction motor rotor. The rotor teeth are divided into pairs by intermediate bars 22 of the squirrel cage starting winding and each pair of teeth occupies the space corresponding to one primary stator tooth. 23 represents the high frequency generating winding wound in opposite directions on adjacent teeth and connected in series relation so that their voltages will add. This winding is connected to slip rings 24 and brushes 25 connect to the outgoing circuit 17. In this case the bipolar magnetic field rotates but is stationary with respect to the rotor at the synchronous operating speed. The squirrel cage winding is merely a starting winding and equivalent or other means may be provided for this purpose. A polyphase primary winding is preferable on account of starting but a single phase primary winding might be used with a repulsion motor starting winding on the secondary. The particular pole number and tooth arrangement represented is merely by way of example and it is not intended to limit the invention in this and other respects which may be modified by those skilled in the art without departing from the invention.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. A frequency changer comprising relatively rotatable primary and secondary members, a multipolar alternating current energizing winding on the primary member, polar salients on the secondary member corresponding to the pole number of said energizing winding, said parts constituting a synchronous reaction motor, teeth on the primary member and teeth on the polar salients of the secondary member, said teeth being spaced to produce inductor alternator distribution of the flux of said motor in the teeth of the polar salients of the secondary member at synchronous speed, and a high frequency inductor alternator winding on the teeth of the polar salients.

2. A frequency changer comprising relatively rotatable primary and secondary members, a multipolar alternating current energizing winding on the primary member, corresponding polar salients on the secondary member, a secondary starting winding on the secondary member, said parts comprising a self-starting synchronous reaction motor, cooperating teeth in the primary member and in the polar salients of the secondary member spaced to produce inductor alternator distribution of the flux of said motor in the teeth of the polar salients at synchronous speed and a high frequency inductor alternator winding on the teeth of the polar salients.

3. A frequency changer comprising relatively rotatable primary and secondary members, a polyphase multipolar alternating current energizing winding on the primary member, corresponding polar salients on the secondary member, a squirrel cage winding on the secondary member, said parts comprising a self-starting synchronous reaction motor, co-operating teeth in the primary member and in the polar salients of the secondary member spaced to produce inductor alternator distribution of the flux in the teeth of the polar salients at synchronous speed, the bars of the squirrel cage winding being spaced and located in the secondary member so as to be non-responsive to the inductor alternator flux distribution, and a high frequency inductor alternator winding on the teeth of said polar salients.

4. A frequency changer comprising relatively rotatable primary and secondary members, a multipolar alternating current energizing winding on said stator member, polar salients on the secondary member corresponding to the pole number of said primary winding, teeth in the polar salients of said secondary member, teeth in the primary member of approximately the same dimensions as the teeth in the polar salients but spaced twice as far apart as the teeth in the polar salients, and a high frequency generating winding on the secondary member comprising series connected coils wound on adjacent teeth in opposite directions.

5. A frequency changer comprising relatively rotatable primary and secondary members, a multipolar alternating current energizing winding on said primary member, polar salients in the secondary member corresponding to the pole number of the primary winding, a secondary starting winding on the secondary member, said parts comprising a self-starting synchronous reaction motor, teeth in the polar salients of the secondary member, teeth in the primary member of approximately the same dimensions as those in the polar salients, but spaced twice as far apart as those in the polar salients, coils on the salient pole teeth, adjacent coils being wound in opposite directions and connections to said coils for taking off a high frequency current.

6. A frequency changer comprising relatively rotatable primary and secondary members, a polyphase multipolar alternating current energizing winding on said primary member, polar salients in the secondary member corresponding to the pole number of the primary winding, a squirrel cage winding on the secondary member, said parts constituting a self-starting synchronous reaction motor, an even number of teeth in each polar salient, teeth in the primary member of approximately the same dimensions as those in the polar salients but spaced twice as far apart, the bars of the squirrel cage in the polar salients being located between pairs of teeth therein, coils on the salient pole teeth, adjacent coils being connected in reversed series relation, and means for connecting the coils on the polar salients to an external circuit.

In witness whereof, I have hereunto set my hand this 22nd day of December 1927.

FRANK W. MERRILL.